United States Patent
Zazueta-Hall et al.

(10) Patent No.: US 10,339,682 B2
(45) Date of Patent: Jul. 2, 2019

(54) METHOD AND APPARATUS FOR ENERGY DATA VISUALIZATION

(71) Applicant: Enphase Energy, Inc., Petaluma, CA (US)

(72) Inventors: Ilen Zazueta-Hall, Sebastopol, CA (US); Sara Beth Brown, Petaluma, CA (US); John Coleman Gibbs, Sonoma, CA (US); Jamie Eric Ruderman, Santa Rosa, CA (US); Brenda Catherine Strech, Petaluma, CA (US); Leesa Lee, Sausalito, CA (US); Benjamin Lewis Smith, Petaluma, CA (US); Robert M. Serafini, Santa Rosa, CA (US)

(73) Assignee: Enphase Energy, Inc., Petaluma, CA (US)

( * ) Notice: Subject to any disclaimer, the term of this patent is extended or adjusted under 35 U.S.C. 154(b) by 383 days.

(21) Appl. No.: 14/166,269

(22) Filed: Jan. 28, 2014

(65) Prior Publication Data

US 2014/0210845 A1 Jul. 31, 2014

Related U.S. Application Data

(60) Provisional application No. 61/757,513, filed on Jan. 28, 2013.

(51) Int. Cl.
*G06T 11/20* (2006.01)

(52) U.S. Cl.
CPC .................................. *G06T 11/206* (2013.01)

(58) Field of Classification Search
CPC .. G06F 3/048; G06F 11/3058; G06F 11/3062; G06F 11/32
See application file for complete search history.

(56) References Cited

U.S. PATENT DOCUMENTS

| | | |
|---|---|---|
| 2006/0229847 A1 | 10/2006 | Nakajima |
| 2009/0125825 A1 | 5/2009 | Rye et al. |
| 2011/0219254 A1 | 9/2011 | Zatylny et al. |
| 2012/0089665 A1 | 4/2012 | Chung |
| 2013/0009960 A1 | 1/2013 | Smith et al. |

OTHER PUBLICATIONS

"Open Energy Monitor—Emoncms"—May 10, 2012. Accessed via the web on Mar. 22, 2016 via "Internet archive"—https://web.archive.org/web/20120510004926/http://openenergymonitor.org/emon/emoncms.*
PCT Search Report and Written Opinion, PCT/US2014/013347, dated Apr. 16, 2014.

* cited by examiner

*Primary Examiner* — Antonio A Caschera
(74) *Attorney, Agent, or Firm* — Moser Taboada

(57) ABSTRACT

A method and system for providing a visualization of energy data. In one embodiment, the method comprises establishing an energy visualization scale for visually depicting energy data in terms of one or more color parameters, where the energy data pertains to a distributed generator (DG); and generating a display image, based on the energy visualization scale, that depicts a plurality of energy data values in a grid layout across two dimensions in time.

17 Claims, 7 Drawing Sheets

METHOD AND APPARATUS FOR ENERGY DATA VISUALIZATION

CROSS-REFERENCE TO RELATED APPLICATION

This application claims priority to U.S. Provisional Patent Application No. 61/757,513 filed on Jan. 28, 2013, which is incorporated by reference herein in its entirety.

BACKGROUND OF THE INVENTION

Field of the Invention

Embodiments of the present disclosure relate generally to a method and apparatus for visualization of energy data.

Description of the Related Art

Use of distributed generators (DGs) to produce energy from renewable resources is steadily gaining commercial acceptance due to the rapid depletion of existing fossil fuels and the increasing costs of current methods of generating power. One such type of distributed generator is a solar power system. Solar panels within the solar power system are comprised of photovoltaic (PV) modules that convert solar power received into a direct current (DC). An inverter then converts the DC current from the PV modules into an alternating current (AC). The power generated by the solar power system may then be used to run appliances at a home or business, or may be sold to the commercial power company.

Variations in energy produced by the PV modules in a solar power system may be attributed to various causes such as variations in the inverters, PV module mismatch (i.e., variations in power output within the manufacturer's tolerance), PV module or inverter damage, or different insolation profiles for the PV modules. In some cases, differences in insolation profiles may be due to a cause that cannot be altered or fixed, such as an immovable obstruction shading a PV module. In other cases, differences in insolation profiles may be due to correctable causes, such as dust or dirt on the surface of a PV module. However, current monitoring systems do not provide an efficient way to assess system performance over time for rapidly determining performance issues so they can be addressed.

Therefore, there is a need in the art for providing energy data related to a DG in a readily understandable format for performance analysis of the DG.

SUMMARY OF THE INVENTION

Method and apparatus for energy data visualization as shown and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and system for providing a rapidly interpretable visualization of energy data over time. More specifically, a two-dimensional, time-based display of energy data (e.g., data indicating energy production by an energy-producing element or system, such as a distributed generator (DG)) is generated using an adaptive energy visualization scale. The energy visualization scale is established based on a maximum value of energy data, such as the maximum energy produced by a DG over a certain period of time. The visualization may be accompanied by contextual data (e.g., specific values of energy production) for a user to further diagnose the operational history of the system.

In one particular embodiment, energy production data, for example, is sampled and aggregated over time to create a recorded history of energy produced by a given system (such as a DG comprising a plurality of photovoltaic (PV) modules) or, alternatively, by a particular element (such as a single PV module within a DG). The energy data is then presented to a user visually in a grid layout across two dimensions in time depicting, for each of a plurality of discrete time periods, energy production in terms of one or more color components. In some embodiments, the energy production in each time period is depicted in terms of color saturation and color intensity levels, where the levels of saturation and intensity corresponding to a specific energy data value are determined using an adaptive scale based on maximum energy production. Such a visualization leverages the user's pre-attentive processing with respect to the displayed data to allow the user to rapidly assess the energy production performance. In some embodiments, the display is interactive and when a particular time period in the displayed grid is selected, additional contextual data for the system (e.g., a numeric value of energy produced) is displayed to the user. The contextual data further allows the user to visualize and diagnose system performance.

In the embodiments disclosed below, distributed generators (DGs) are discussed as an exemplary energy generation system (hereinafter "system"). The energy generation system may include an array of DGs or in other embodiments may represent a single DG. However, other embodiments may include various other types of data used for monitoring and visualizing energy production or consumption such as meters, individual load profiles, solar irradiance, battery management data.

Figure 1:
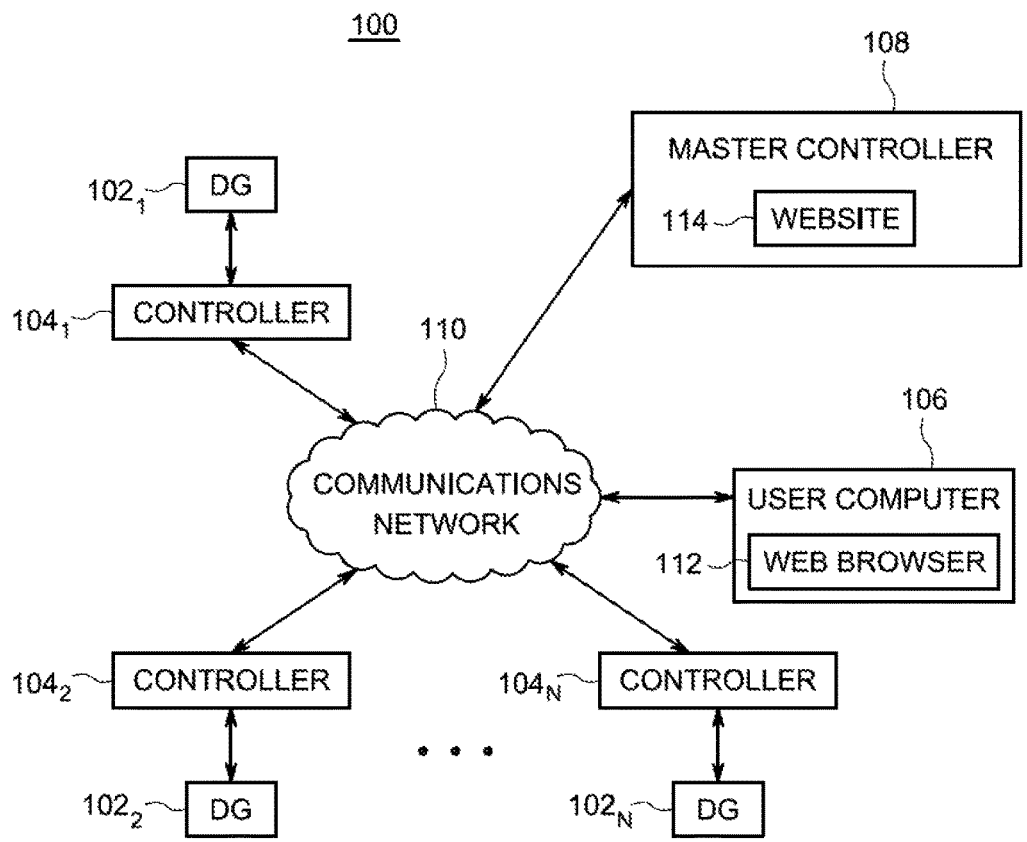
FIG. 1 is a block diagram of a system for providing energy data visualization in accordance with one or more embodiments of the present invention.

FIG. 1 is a block diagram of a system 100 for providing energy data visualization in accordance with one or more embodiments of the present invention. The system 100 comprises a plurality of distributed generators (DGs) $102_1$, $102_2$, . . . $102_n$, (hereinafter, DGs 102), a plurality of controllers $104_1$, $104_2$, . . . $104_n$, (hereinafter, controllers 104), a user computer 106, a master controller 108, and a communications network 110. The controllers 104, the user computer 106, and the master controller 108 are communicatively coupled via the communications network (e.g., the Internet) 110. The master controller 108 is further discussed with respect to FIG. 9 below.

The DGs 102 produce energy from a renewable resource, such as solar energy, wind energy, hydroelectric energy, and the like. In some embodiments, a DG 102 is comprised of a plurality of solar panels arranged in groups as solar arrays, where each solar panel is comprised of one or more inverters coupled to one or more PV modules in a one-to-one correspondence. Additionally, a DC-DC converter may be coupled between each PV module and each inverter (e.g., one converter per PV module). In one or more alternative embodiments, multiple PV modules may be coupled to a single inverter (i.e., a centralized inverter); in some such embodiments, a DC-DC converter may be coupled between the PV modules and the centralized inverter. The PV module generates a direct current (DC) relative to the amount of solar energy it receives. The inverter converts the DC current generated by the PV module to an alternating current (AC). The generated AC current may be used to operate appliances in a home or business, coupled to a commercial power grid and sold to the commercial power utility, or a combination of both. In other embodiments, one or more of the DGs 102 may additionally or alternatively comprise a plurality of wind turbines, as in a "wind farm", for generating the DC current.

Each DG $102_1$, $102_2$, . . . $102_n$ is coupled to a controller $104_1$, $104_2$, . . . $104_n$, respectively, in a one-to-one correspondence. The controllers 104 collect data on the health and performance of the DGs 102, such as measurements of energy production related to the DG 102 (e.g., energy produced by one or more components of the DG 102, or by the entire DG 102), energy consumption related to the DG 102, power generated by one or more components of the DG 102, power consumed from one or more components of the DG 102, and the like. Data may be collected at various levels of system granularity; for example, for a DG 102 comprising a solar energy system, data may be collected for one or more individual PV modules, solar panels, and/or solar arrays, as well as for the entire solar energy system. The data may be collected at various increments (e.g., 5 minute intervals).

The collected data is communicated from the controllers 104 to the master controller 108, where at least a portion of the collected data may be aggregated and further processed for display in accordance with the present invention as described below. Communication between the controller and master controller may vary based on predefined increments of time (e.g., once a day, once a minute, and the like) based on preferences used. Additionally, the controllers 104 and/or the master controller 108 may communicate operational instructions to the DGs 102 for purposes of operating the DGs 102 and their components. The master controller 108 is a type of controller that may contain elements such as application software for managing a plurality of DGs 102, application software for managing the website 114, and/or application software pertaining to generating the data display representing the DG 102 operation as described below.

Using a web browser 112, the user computer 106 may access a website 114 supported by the master controller 108 (or a server having access to the master controller 108 data) to obtain a data display based on the collected data, where the data display represents the operation (e.g., energy production) of the DG 102 (or one or more components of the DG 102) in a readily understandable format as described in detail with respect to the figures described below. Additionally, a multitude of users may access one or more of such displays representing the DG 102 operation via a password protected portal.

In accordance with one or more embodiments of the present invention, energy production data for a DG 102 is collected by the corresponding controller 104 and aggregated by the master controller 108 for display via the website 114. The generated display depicts the energy produced by the DG 102 over time as a two-dimensional array of display images (which also may be referred to as "cells"), where each cell represents energy produced by the DG 102 during a discrete period of time. In order to allow a user to rapidly assess performance of the DG 102, each cell depicts the amount of energy produced in the corresponding time period as a function of one or more parameters of color based on an energy visualization scale.

In one embodiment, the energy visualization scale provides a mapping of energy production in terms of both saturation and intensity for a particular hue, where the maximum energy production value of the scale is set based on the maximum energy production of the DG 102 for which it is applied. For example, the energy visualization scale may be a linear scale ranging from zero (i.e., no energy production by the DG 102) to maximum energy production by the DG 102, where levels of both color saturation and color intensity are mapped to particular values of energy production along the scale. In such an embodiment, the energy visualization scale may be established such that the displayed cells range from visually black (e.g., 0% intensity/ 100% saturation) to represent zero energy production by the DG 102, to very light/bright blue (e.g., 100% intensity/50% saturation) to represent energy production at the maximum.

In another embodiment, the energy visualization scale may be based on a color gradient; for example, the colors red and green may be mapped to zero energy production and maximum energy production, respectively, on the energy visualization scale, where suitable colors to transition from red to green are mapped between zero and maximum energy production along the energy visualization scale.

In one or more alternative embodiments, other types of production or consumption data, such as energy produced by one or more PV modules within the system 100, energy produced by a plurality of DGs 102, energy consumption, power generation, power consumption, or the like, may be displayed as described herein to provide a user with a readily understandable visualization of the data.

Figure 2:
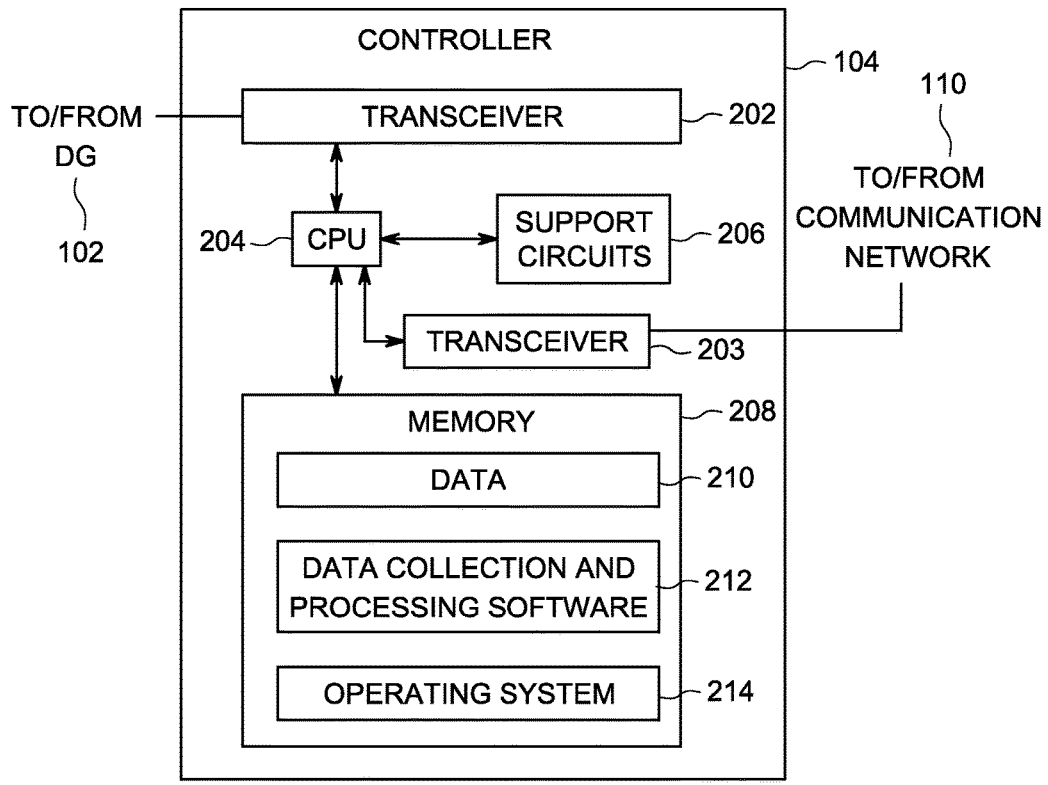
FIG. 2 is a block diagram of a controller in accordance with one or more embodiments of the present invention.

FIG. 2 is a block diagram of a controller 104 in accordance with one or more embodiments of the present invention. The controller 104 may be comprised of hardware, software, or a combination thereof and comprises a transceiver 202, at least one central processing unit (CPU) 204, support circuits 206, and a memory 208. The CPU 204 may comprise one or more conventionally available microprocessors, microcontrollers and/or combinations thereof configured to execute non-transient software instructions to perform various tasks in accordance with the present invention. Alternatively, the CPU 204 may include one or more application specific integrated circuits (ASIC). The support circuits 206 are well known circuits used to promote functionality of the central processing unit. Such circuits include, but are not limited to, a cache, power supplies, clock circuits, buses, network cards, input/output (I/O) circuits, and the like. The controller 104 may be implemented using a general purpose computer that, when executing particular software, becomes a specific purpose computer for performing various embodiments of the present invention.

The memory 208 may comprise random access memory, read only memory, removable disk memory, flash memory, and various combinations of these types of memory. The memory 208 is sometimes referred to as main memory and may, in part, be used as cache memory or buffer memory. The memory 208 generally stores the operating system 214, if necessary, of the controller 104. The operating system 214 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 208 may store various forms of application software, such as data collection and processing software 212 for collecting operational data (e.g., power production data, power consumption data, measurements of electrical power data, and the like) from the corresponding DG 102. In addition, the memory 208 may also store data 210 related to the corresponding DG 102. Such data may be collected and stored at various levels of component granularity; for example, for a DG 102 comprising a solar energy system, data may be collected and stored for one or more individual PV modules, solar panels, and/or solar arrays, as well as for the entire solar energy system. The data collection and processing software 212 in some embodiments may comprise equations and geographical location data such that data sent for display on the website 114 is accurately portrayed. Further embodiments may include a time scale module 216 as part of memory 208 for storing data related to the sampling for particular time periods of the data 210 to the master controller 108. The time scale module 216 may adjust the time sampling period size (e.g., hours to minutes) and/or store or send data 210 with respect to a specified time period. The time scale module 216 provides data for adjusting the two-dimensional representation of energy data for one or more components of the DG 102 as discussed in further detail below with respect to FIG. 3.

The transceiver 202 couples the controller 104 to the DG 102 (via wireless and/or wired techniques, such as power line communications (PLC) in some embodiments) to facilitate command and control of the DG 102. Data 210 regarding operation of the DG 102 (such as energy produced by one or more components of the DG 102, energy consumption related to the DG 102, power generated by one or more components of the DG 102, power consumed, and the like) is collected by the controller 104 via the transceiver 202. Data 210 may include energy generated by one or more components of the DG 102 (including the DG 102 itself) that is sampled at a fixed interval (e.g., every second, minute, and the like). The data 210 may be stored locally in memory 208 for processing by the time scale module 216. In other embodiments, the data 210 is periodically or continually (i.e., as it is collected) sent to the master controller 108 for processing and storage. Displayed data may also be retrieved on user demand or via polling of the controller 104. The time interval of the polling is based on the timeframe selected for display. For example, if the selected timeframe is the last 5 minutes, polling may be an immediate polling and every 30 seconds. For larger timeframes such as a year, polling may be for a proportionally longer period such as every hour as changes accumulated for every 30 seconds would not be readily apparent in the displayed data.

The controller 104 further comprises transceiver 203 for communication to and from the communications network 110. The transceiver 203 is communicatively coupled to the CPU 204 for facilitating communication across the communications network 110 to the master controller 108. The transceiver 203 may be communicatively coupled to the communications network 110 using wireless and/or wired techniques. In some embodiments, the transceiver 202 and transceiver 203 may be a single transceiver.

Figure 3:
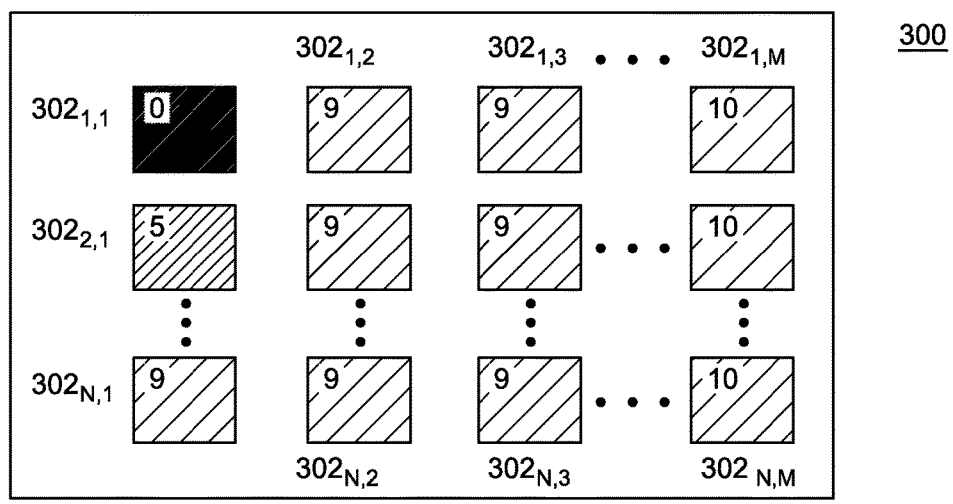
FIG. 3 is a representation of a display for energy data visualization across two dimensions in time in accordance with one or more embodiments of the present invention.

FIG. 3 is a representation of a display 300 for energy data visualization across two dimensions in time in accordance with one or more embodiments of the present invention. In one particular embodiment, the two-dimensional time-based display 300 (which may be referred to as "display 300") depicts the energy produced by a particular DG 102 over time.

In one specific embodiment, the display 300 graphically comprises a plurality of cells $302_{1,1}$, $302_{1,2}$, . . . , $302_{n,m}$, collectively known as cells 302, where each cell 302 represents energy produced by the DG 102 over a discrete time period. The cells 302 are arranged in accordance with a particular temporal granularity. For example, a user may select a "year view" where each row of the display 300 represents a different year and each cell 302 within a particular row represents a different month of that year. Alternatively, a user may select other types of views, such as a "month view" where each row of the display 300 represents a different month and each cell 302 within a particular row represents a different day of that month, or a "day view" where each row of the display 300 represents a different day and each cell 302 within a particular row represents a different time interval (e.g., a 15-minute time interval) within that day. In some embodiments, a user may be able to select a customized temporal view where each cell 302 represents a time interval as specified by the user. The resulting cells 302 may be displayed with spaces between adjacent cells 302 (as depicted in FIG. 3), or having their edges flush so that there are no spaces between the adjacent cells 302.

As illustrated in FIG. 3, different levels of energy produced over the time periods represented by the cells 302 are depicted by different densities of cross-hatching. In some embodiments, the different densities of cross-hatching shown in FIG. 3 represent different levels of color saturation and intensity for a particular hue. Additionally, a user may obtain additional data related to one or more cells 302; for example, a numerical value indicating the energy produced by the DG 102 may be displayed in the corresponding cell 302 (as shown in FIG. 3), or a user may click on one or more cells 302, position a cursor over one or more cells 302, or perform a similar function to obtain additional data such as the value of energy production associated with one or more particular cells 302.

The visualization of energy production represented as the display 300 for a specified time scale allows a user to rapidly assess performance of the DG 102 over time. The user's pre-attentive processing is enhanced using adjustable depictions (e.g., color saturation and intensity levels, color gradients, or the like) that adapt to changing energy generation capacities of the DG 102. Specific measurements of energy production for particular time periods may be calculated and/or stored remotely (e.g., by the master controller 108) or locally (e.g., by the controllers 104) for each DG 102, and subsequently used for generating the display 300.

In order to produce a visualization of energy data, an energy visualization scale is established and used to generate the display 300 as depicted in FIG. 3. In one or more embodiments, the energy visualization scale is based on a hue, saturation, and intensity (HSI) color description where a specific hue (e.g., blue) is assigned to represent a specific type of energy data to be visualized, such as energy produced by a particular DG 102. In alternative embodiments, blue (or any other hue) may be assigned to represent a different type of energy data from any one of a myriad of types of energy data pertaining to one or more components of the DGs 102. In alternative embodiments, the visualization scale may represent power rather than energy.

In some embodiments, energy consumption related to one or more DGs 102 may also be visualized. For example, consumption of energy from one or more branch circuits of the DG 102 may be tracked on a sub-hourly basis and scaled by a time-of-use (TOU) rate schedule prior to being visualized. A visualization of energy consumption cost such as this may help users optimize their consumption against the TOU rate schedule to achieve the greatest financial benefit.

In some embodiments, the energy visualization scale establishes a level of color saturation and intensity for the selected hue as a function of the energy produced by a particular DG 102. To achieve this, a linear scale of the DG energy production is established ranging from zero (i.e., 0%) to maximum energy (i.e., 100%), where zero represents no energy production by the DG 102 and maximum energy represents the maximum energy production by the DG 102. In some embodiments, the value of the maximum energy production by the DG 102 may be determined based on actual energy production data for the DG 102 (e.g., data recorded over the lifetime of the DG 102). In other embodiments, the value of the maximum energy production may be calculated; for example, a maximum potential energy production for the DG 102 may be calculated based on the nameplate rating of one or more PV panels of the DG 102 and expected harvest time based on location of the DG 102). By defining the upper-bound of the energy visualization scale based on a maximum energy production for a particular DG 102, the energy visualization scale is adaptive to the maximum energy production (real or calculated) for the DG 102 over its lifetime and can be dynamically adjusted to account for changes in the DG 102 that impact potential energy production (e.g., additional PV panels being added, and the like). In the unlikely event that potential energy production is decreased (e.g., a PV panel is permanently removed) the past production will be displayed by maintaining the new potential energy production and shown as producing over potential. In other embodiments, selected past production may be scaled using the potential energy production at the time of recordation for a more accurate temporal energy visualization scale.

The energy visualization scale is then established by mapping color saturation and color intensity to the linear scale. In one embodiment, a linear interpolation of color saturation of the selected hue from 100% to 50% saturation is mapped to the range of values from 50 to 100 on the linear scale and a color saturation of 100% is mapped to values from 0 to 50 on the linear scale. In conjunction with the saturation, a linear interpolation of intensity from 0% to 100% intensity is mapped to the range of values from 0 to 50 on the linear scale and an intensity level of 100% is mapped to values from 50 to 100 on the linear scale. By utilizing the resulting scaled color saturation and intensity levels, the energy generated by the DG 102 over particular time period can be visualized by a displayed cell 302 have a color at a particular saturation and intensity, thereby creating a readily understandable display representing the operation of the DG 102. A visual depiction of the energy visualization scale may be included in the display 300, for example a display of the color saturation and intensity range from the minimum to the maximum energy production value.

In some embodiments, the energy visualization scale is established by mapping a linear interpolation of red/green/blue (RGB) components of a particular color to the linear scale from 0% to 100%. In such embodiments, three colors ($C_1$, $C_2$, and $C_3$) of the same hue are selected, where $C_1$ is generally low-intensity and high-saturation, $C_2$ is high in both intensity and saturation, and $C_3$ is high-intensity but less saturated than $C_2$. For example, $C_1$ may be black, $C_2$ may be blue, and $C_3$ may be bluish-white. A linear interpolation of $C_1$ and $C_2$ is mapped to the values from 0 to 50 on the linear scale, and a linear interpolation of $C_2$ and $C_3$ are mapped to the values from 50 to 100. For example, colors $C_1$, $C_2$, and $C_3$ having RGB component values of (0, 0, 0), (0, 137, 237), and (162, 219, 255), respectively, would result in the following linear scale/RGB component value mappings: 0%=>(0, 0, 0); 25%=>(0, 68, 118); 50%=>(0, 137, 237); 80%=>(97, 186, 248); and 100%=>(162, 219, 255).

In some embodiments, $C_1$ may be selected as a color other than black, for example to reflect that a displayed value of "0" on the energy visualization scale (i.e., a display of $C_1$) depicts a minimum-performance rather than an absolute value of zero energy produced.

Based on capabilities of a display screen for the display 300, the values on the energy visualization scale may be continuous (e.g., each distinct scaled value maps to a different color value) or quantized to obtain a small number (e.g., 128) of distinct values for display.

The data for energy produced by the DG 102 may be obtained by the master controller 108 on a periodic basis and mapped to the energy visualization scale to update one or more cells 302 for display. In some embodiments, individualized energy visualization scales may be utilized for different DGs 102 based on their characteristics (such as type of components within the DGs, size of the DGs, and the like).

Figure 4:
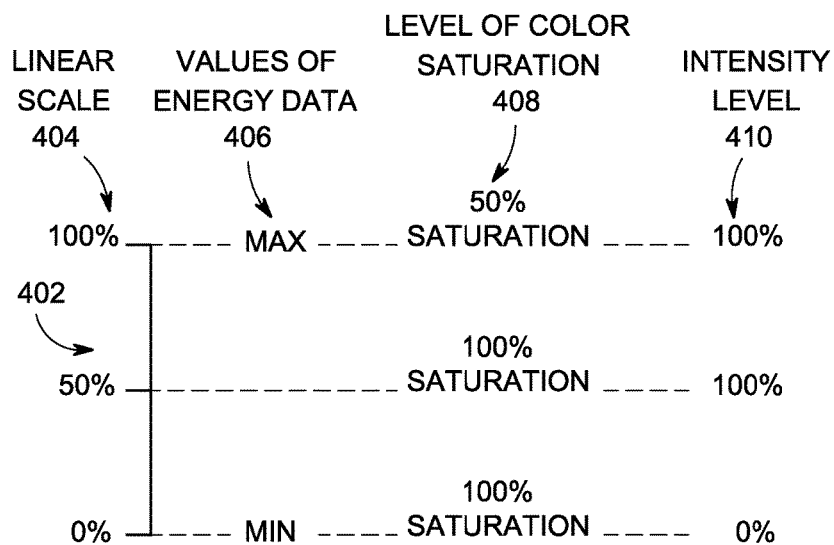
FIG. 4 is a representation of an energy visualization scale in accordance with one or more embodiments of the present invention.

FIG. 4 is a representation of an energy visualization scale 402 in accordance with one or more embodiments of the present invention. In the embodiment of the energy visualization scale 402 described below, the energy visualization scale 402 pertains to energy production by a DG over a period of time. In other embodiments, the energy visualization scale 402 may pertain to production or consumption data for other system granularities (such as a plurality of DGs, one or more components or a DG, or the like).

Values of energy produced by a DG over a period of time ("energy data 406") are mapped based on a linear scale 404 to a color saturation percentage 408 and color intensity level 410. Values of energy data 406 range from a minimum (e.g., 0) to a maximum energy production are linearly mapped to a linear scale 404, e.g., ranging from 0% to 100% of maximum energy production.

The level of color saturation 408 for a particular color hue ranging from 50% to 100% is linearly mapped to values from 100% to 50% of the of maximum energy production on the linear scale 404, where 50% color saturation corresponds to a value of 100% maximum energy production and 100% color saturation corresponds to a value of 50% of maximum energy production. Additionally, a color saturation of 100% for the hue is mapped to values from 50% to 0% of the maximum energy production on the linear scale 404.

The intensity level 410 ranging from 0% to 100% is linearly mapped to values from 0% to 50% of the maximum energy production on the linear scale 404, where 0% intensity corresponds to a value of 0 energy production and 100% intensity corresponds to a value of 50% of maximum energy production. Additionally, an intensity level of 100% is mapped to values from 50% to 100% of maximum energy production.

The linear scale 404 is thus adaptive based on the maximum energy generation of the DG over a particular time granularity. Accordingly, different scales may be established based on a selected timescale or a different system granularity.

Figure 5:
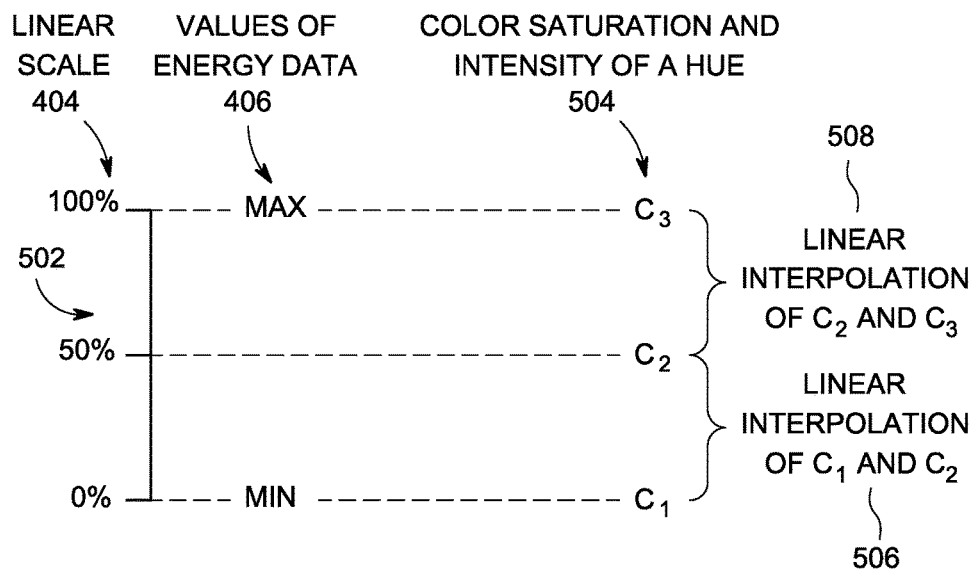
FIG. 5 is a representation of an energy visualization scale in accordance with one or more embodiments of the present invention.

FIG. 5 is a representation of an energy visualization scale 502 in accordance with one or more embodiments of the present invention. In the embodiment of the energy visualization scale 502 described below, the energy visualization scale 502 pertains to energy production by a DG over a period of time. In other embodiments, the energy visualization scale 502 may pertain to production or consumption data for other system granularities (such as a plurality of DGs, one or more components or a DG, or the like).

Values of energy produced by a DG over a period of time ("energy data 406") are mapped to a linear scale 404, as previously described with respect to FIG. 4. Colors $C_1$, $C_2$, and $C_3$, each comprising a different level of saturation and intensity of a particular hue 504, are mapped to values 0%, 50%, and 100% of the maximum energy production, respectively, on the linear scale 404. In some embodiments, $C_1$ is a color having low-intensity and high-saturation, $C_2$ is high in both intensity and saturation, and $C_3$ is high-intensity but less saturated than $C_2$. A linear interpolation of $C_1$ and $C_2$ 506 (i.e., a linear interpretation of $C_1$ and $C_2$ red/green/blue (RGB) components) is mapped to linear scale values ranging from 0% to 50% of the maximum energy production. A linear interpolation of $C_2$ and $C_3$ 508 (i.e., a linear interpretation of $C_2$ and $C_3$ red/green/blue (RGB) components) is mapped to linear scale values ranging from 50% to 100% of the maximum energy production.

Figure 6:
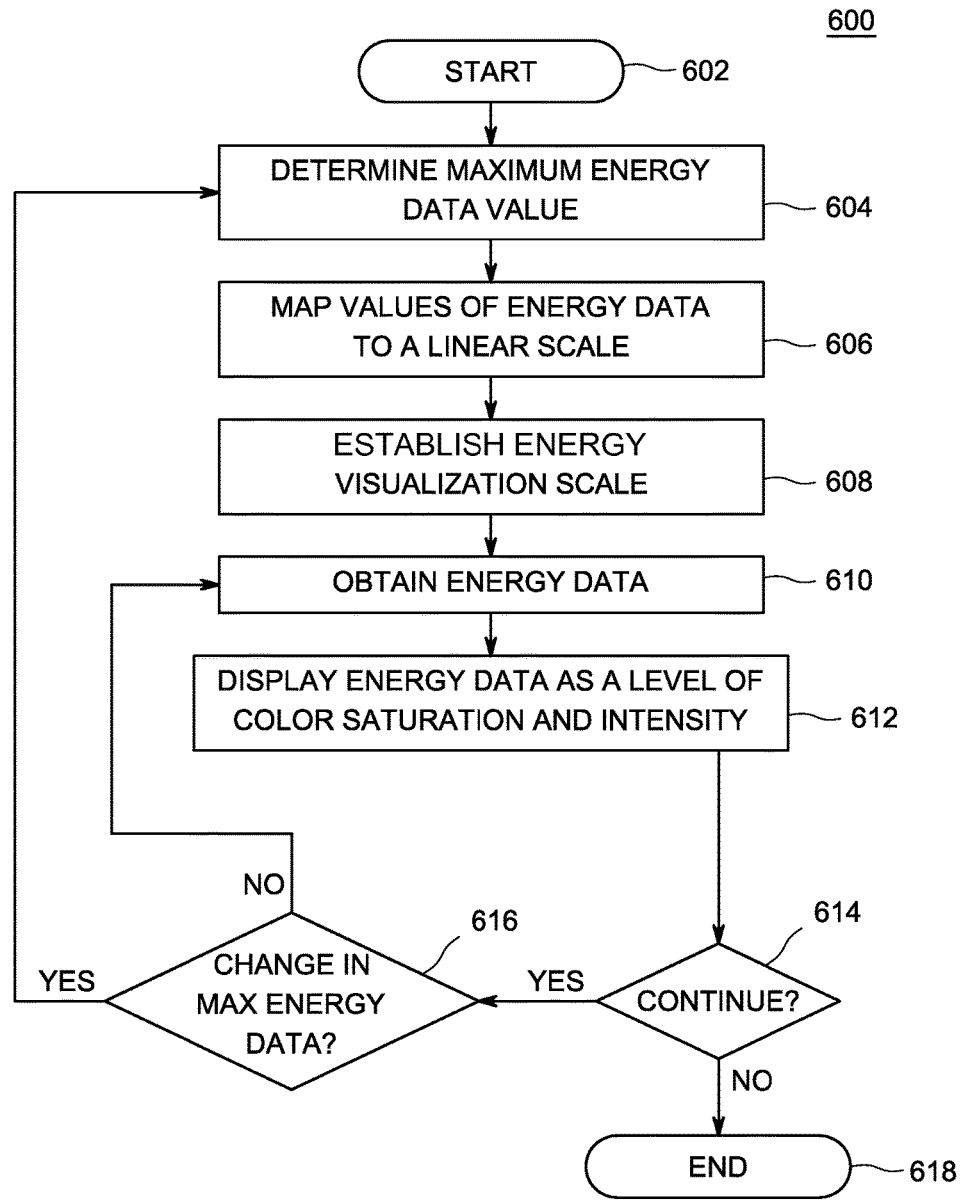
FIG. 6 is a flow diagram of a method for displaying a visualization of energy production across two dimensions in time in accordance with one or more embodiments of the present invention.

FIG. 6 is a flow diagram of a method 600 for displaying a visualization of energy production across two dimensions in time in accordance with one or more embodiments of the present invention. The method 600 represents one embodiment of an implementation of the visualization module 916 described below with respect to FIG. 9. In some embodiments, a computer readable medium comprises a program that, when executed by a processor, performs at least a portion of the method 600 that is described in detail below.

In some embodiments, such as the embodiment described below, energy production by a DG is displayed; e.g., data for energy production by a DG 102 is communicated via a controller 104 to a master controller 108 where it is processed for display to a user via the website 114. In other embodiments, energy production data may be displayed for one or more particular DG components (e.g., one or more PV modules) or a plurality of DGs; alternatively, other types of data may be displayed (e.g., other types of production data or consumption data, such as energy consumption data), The method 600 begins at step 602 and proceeds to step 604. At step 604, a maximum energy production by the DG is determined. The maximum energy production by the DG over a particular time period may be determined based on a desired time-granularity to be displayed using potential production and environmental data (e.g., the number of PV modules and the potential daylight or harvesting time for a time period). For example, for a two-dimensional grid display where each cell displayed represents one day, the maximum energy produced by the DG over a single day is determined. The desired time granularity for display may be selected by a user via a web browser, or alternatively may be a default value.

In some embodiments, the maximum energy production may be determined based on actual energy production data collected for the DG. In other embodiments, the maximum energy production may be calculated using, for example, the nameplate rating of one or more PV panels of the DG and expected harvest time based on location of the DG.

The method 600 proceeds to step 606 where a linear scale is established, such as the linear scale 404, and values of energy production ranging from a minimum value (e.g., zero) to a maximum value (determined at step 604) are mapped (e.g., linearly mapped) to the linear scale. The method 600 then proceeds to step 608, where an energy visualization scale is established. In some embodiments, a particular hue (e.g., blue) is selected and color saturation and intensity levels are mapped to the linear scale as previously described with respect to FIG. 4. In other embodiments, the energy visualization scale is established by mapping a linear interpolation of red/green/blue (RGB) components of a particular color to the linear scale. In still other embodiments, the energy visualization scale is established by mapping a color gradient to the linear scale, for example, two different colors may be mapped to zero energy production and maximum energy production, respectively, and suitable colors are mapped in between to smoothly transition between the colors representing zero and maximum energy production. The established energy visualization scale provides a means for depicting an amount of energy produced over a given time period as a function of one or more color parameters, such as intensity and saturation for a particular hue.

The method 600 proceeds to step 610. At step 610, energy production data to be visualized is obtained. In some embodiments such energy data may be periodically obtained from the DG, aggregated and stored, for example by a master controller (e.g., the master controller 108) communicatively coupled to the DG. At step 612, the energy visualization scale is utilized to determine the color-related display parameters (e.g., values of color saturation and intensity for a particular hue) for depicting the level of energy production for the time period represented by each grid cell for display (e.g., such as in the display 300). The resulting two-dimensional time-based grid is then displayed, providing the user with a high-density visual representation of energy production over time that simplifies analysis of the data such as identifying outliers for low energy production. In some embodiments, the obtained energy production data may be scaled by a TOU rate prior to being displayed.

The method 600 proceeds to step 614, where a determination is made whether to continue. If the result of such determination is yes, the method 600 proceeds to step 616 where it is determined whether there is any change in the maximum energy production by the DG. For example, changes to the DG (such as adding PV modules) or changes to the surrounding landscape (such as removal of an obstacle like a tree that shades one or more PV modules) result in a greater possible energy production by the DG. If the result of the determination at step 616 is yes, then the method 600 returns to step 604 to adaptively update the energy visualization scale. If the result of the determination at step 616 is no, the method 600 returns to step 610 to display additional energy production data (e.g., a last cell in the grid display may be updated or, if a new time period has begun, a new cell may be added at the end of the grid display).

If, at step 614 it is determined not to continue, the method 600 proceeds to step 618 where it ends.

Figure 7:
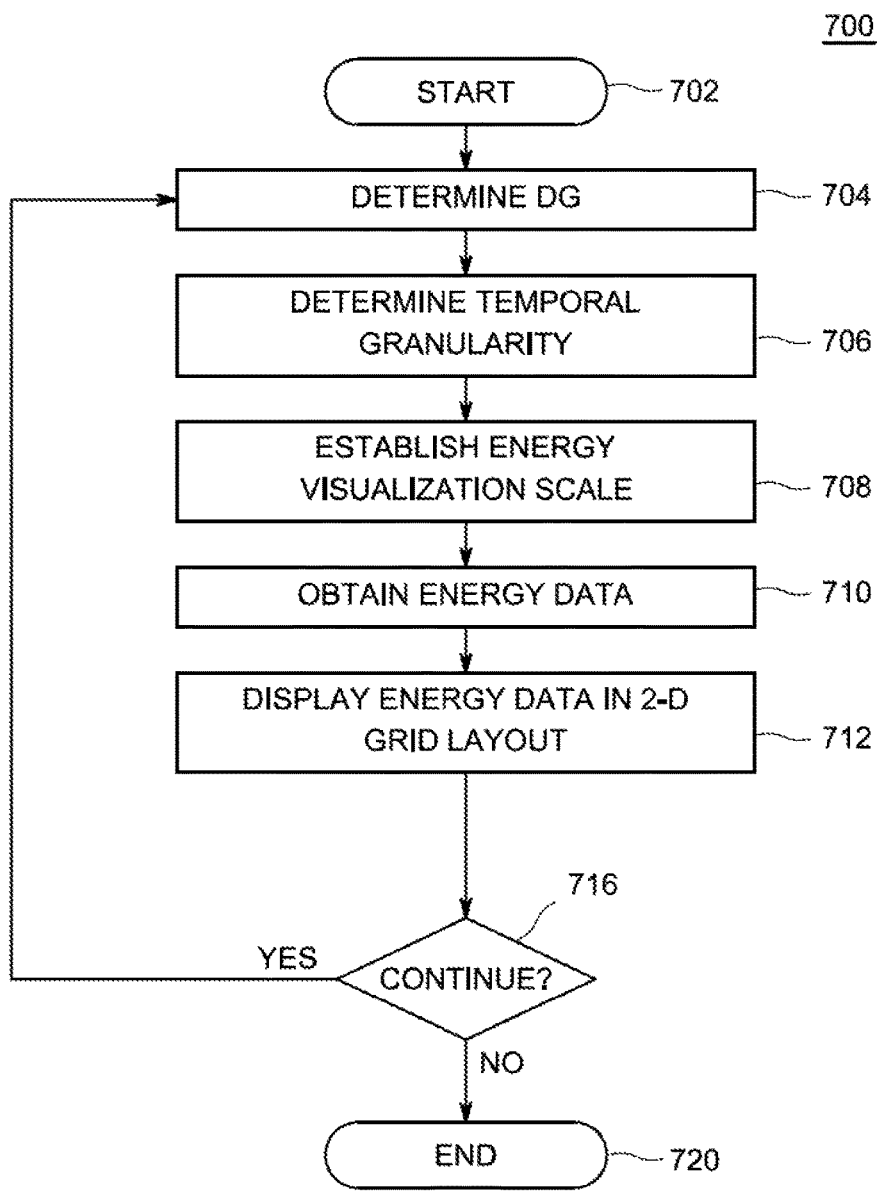
FIG. 7 is a flow diagram of a method for displaying a visualization of energy data in accordance with one or more embodiments of the present invention.

FIG. 7 is a flow diagram of a method 700 for displaying a visualization of energy data in accordance with one or more embodiments of the present invention. The method 700 represents one embodiment of an implementation of the visualization module 916 described below with respect to FIG. 9. In some embodiments, a computer readable medium comprises a program that, when executed by a processor, performs at least a portion of the method 700 that is described in detail below.

In some embodiments, such as the embodiment described below, energy production by a DG (e.g., a particular DG 102 within the system 100) is displayed in a two-dimensional time-based grid format (e.g., the display 300). In such a gird display, each cell of the grid represents a period of time and depicts the energy produced during that time period by the DG in terms of one or more color parameters. In other embodiments, energy production data may be displayed for one or more particular DG components (e.g., one or more PV modules) or a plurality of DGs; alternatively, other types of data may be displayed (e.g., other types of production data or consumption data, such as energy consumption data).

The method 700 begins at step 702 and proceeds to step 704 where a user selects a particular DG for which they wish to view the energy production data. The user may select the particular DG by logging into (e.g., entering a user name and password) a website that provides an energy data visualization display pertaining to one or more DGs (e.g., the user may log into the website 114 for viewing an energy data visualization display pertaining to one or more of the DGs 102). In some embodiments, the user may select the desired DGs from a plurality of DGs. In other embodiments, the user may select one or more components of one or more DGs (e.g., one or more PV modules), or a plurality of DGs, to view an associated energy data visualization display. In certain alternative embodiments, the energy data visualization display pertains to a particular DG, group of DGs, or set of DG components that is not selectable by the user (i.e., a default may be used).

At step 706, a particular temporal granularity is determined for the display. In some embodiments, the user may select the temporal granularity from a plurality of pre-determined granularities, such as a "year view" where each row of the grid display represents a different year and each cell within a particular row represents a different month of that year, a "month view" where each row of the grid display represents a different month and each cell within a particular row represents a different day of that month, a "day view" where each row of the grid display represents a different day and each cell within a particular row represents a different time interval (e.g., a 15-minute time interval) within that day, or a similar pre-determination time granularity. As part of selecting a pre-determined granularity, the user may enter a desired time range for the display (e.g., for the "year view" the user may enter a range of years for which the data is to be displayed). Additionally or alternatively, the user may be able to select a customized temporal granularity where each cell of the grid display represents a time interval as specified by the user. In certain embodiments, a user selects the temporal granularity of the display by logging into (e.g., entering a user name and password) a website (e.g., the website 114) to access the energy visualization display. In one or more embodiments, a default time granularity may be used for the grid display.

The method 700 proceeds to step 708. An energy visualization scale is established for mapping the level of energy produced over the selected temporal granularity to one or more color parameters (such as color saturation and intensity levels for a particular hue), where the energy visualization scale may be established based on the maximum energy production over the selected temporal granularity, as previously described with respect to the method 600.

Figure 8:
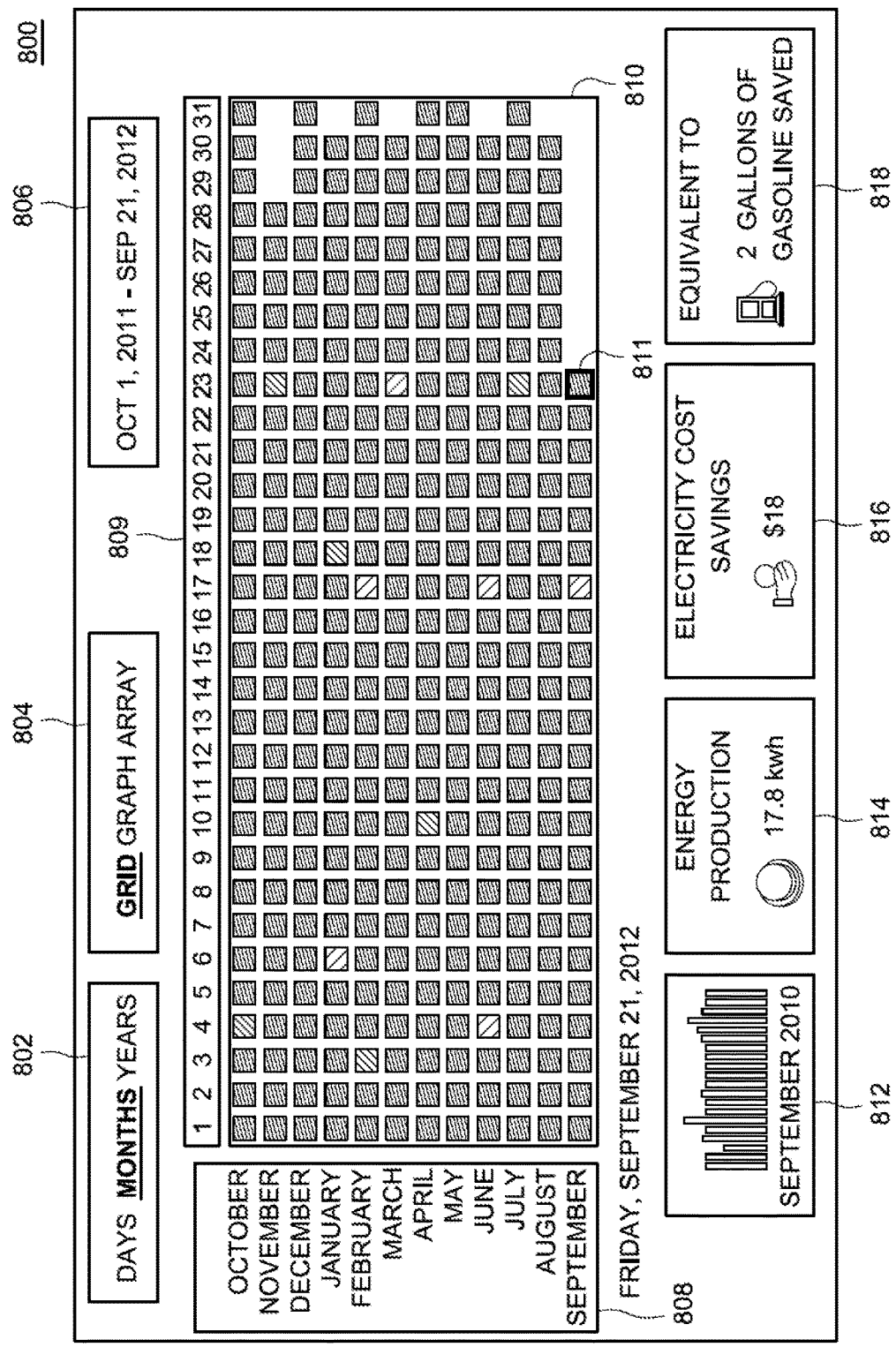
FIG. 8 is a representation of a display for energy data visualization in accordance with one or more embodiments of the present invention.

At step 710, the energy production data for display is obtained. In some embodiments, the energy production data may be stored historical data that has been previously aggregated to obtain the energy produced over various time periods; alternatively, stored historical data may be aggregated as needed at the time of display. The energy production data is then mapped to the energy visualization scale. The method 700 then proceeds to step 712 where the resulting two-dimensional grid is displayed. In some embodiments, additional data may be displayed along with the grid display for assisting the user in understanding the DG performance. For example, the user may click on one or more grid cells, position a cursor over one or more cells, or perform a similar function to obtain additional data such as the value of energy production associated with identified cell or cells. Legends and/or other types of graphical displays may also be displayed, for example as depicted in FIG. 8 described below.

Further, extrinsic context data related to the energy generation data may be displayed along with the energy visualization grid display; such data may be obtained from a remote server or stored in the master controller for the system. For example, data regarding external factors impacting energy production may be displayed, such as weather data, GPS location (since some regions of the earth receive more daylight hours than others), recorded time of year (i.e., winter hours for a region may have shorter harvesting hours than summer hours), system modification (i.e., addition of PV panels to the DG, which increases energy harvest capacity) and the like. Extrinsic context data allows a user to diagnose system performance by equating a logical causal affect to a specific energy generation value.

In some embodiments, the grid display may be updated in real-time as additional data becomes available. For example, the display of a grid cell representing a current time period (e.g., the current day) may be periodically updated as additional energy production data becomes available, or a new cell may be displayed in the grid as a new time period is entered (e.g., at midnight when the next day begins).

The method 700 proceeds to step 716, where a determination is made whether to continue. If the result of such determination is yes, the method 700 returns to step 704. If, at step 716, the result of the determination is no, the method 700 proceeds to step 720 where it ends.

In one or more embodiments, multiple users at one or more distinct locations may simultaneously view energy data visualization displays obtained via the method 700. The users may remotely access the website to select their desired criteria, as described above, and remotely obtain the resulting displays of the desired energy visualization.

FIG. 8 is a representation of a display 800 for energy data visualization in accordance with one or more embodiments of the present invention. The display 800 provides a visual indication of energy generated by, for example, a DG over a time period having the temporal granularity as indicated in display regions 808 and 809. In other embodiments, other types of data may be displayed (e.g., other types of production data, consumption data such as energy consumption data, and the like), and/or the data displayed may pertain to a different level of system granularity, such as one or more components (e.g., PV modules) within one or more DGs, a plurality of DGs, and the like.

According to the embodiment depicted in FIG. 8, a range of months are vertically listed in the display region 808 to the left of the two-dimensional grid 810 (which is one embodiment of the display 300 previously described), and days in the month are horizontally numbered (i.e., 1, 2, . . . 31) in the display region 809 atop the grid 810 for the particular time period chosen (e.g., from Oct. 1, 2011-Sep. 21, 2012 as depicted in display region 806 of FIG. 8). For the embodiment depicted in FIG. 8, each cell within the grid depicts the level of energy produced by the DG over a particular day of a particular month. For example, the cell 811 depicts the level of energy produced by the DG over Sep. 21, 2012.

In other embodiments, a temporal view of "Days" or "Years" may be selected via the temporal view selection region 802 in order to view trends over different time periods. For example, if "Days" is chosen in the temporal view selection region 802, the display region 808 will vertically list the days of the week (i.e., "Monday" through "Sunday") for a specified week or weeks, the display region 809 horizontally lists consecutive time increments throughout a day (such as hours or 15-minute intervals), and each cell of the grid 810 depicts the level of energy produced by DG in the corresponding time period (i.e., a particular time period during a particular day). According to another example, if "Years" is chosen in the temporal view selection region 802, the left hand display region 808 will vertically list a range of years (e.g., as selected by the user, such as 2008-current or the like), the display region 809 will horizontally list consecutive months through the year (i.e., January, February, . . . December), and each cell of the grid 810 will depict the level of energy produced by the DG in the corresponding time period (i.e., a particular month of a particular year). In other embodiments, other levels of temporal granularity may be used (e.g., yearly quarters, weeks, or the like), which may be specified by the user or based on a default setting.

The link selection region 804 allows a user to alternate between a "Grid" view (as shown in FIG. 8), a "Graph" view and an "Array" view. In the "Graph" view, the energy production data would be depicted in a graphical view (such as a bar graph or other type of graph). In the "Array", the energy production data would be depicted in an array-type view for a grouping of DGs. For example, a residential system may consist of a single array of PV panels with a common tilt and azimuth. However, a larger commercial system may consist of multiple arrays that may be visually compared to determine the contribution of respective arrays to the commercial system.

The user may also limit the visualization to a particular time period as selected in region 806. In one embodiment, a calendar tool is available in region 806 where a user can select a date range for data to be displayed in the grid 810 such that recent or older recorded histories of energy production may be displayed.

According to some embodiments, the display 800 may also comprise contextual data. Exemplary contextual data includes an bar graph display 812, which displays a bar graph of energy production by DG during a specified subinterval of the grid 810; a total or average energy production by DG over the selected time period, as depicted in the energy production display region 814; a corresponding cost savings for the DG owner, such as the electricity cost savings depicted in cost savings region 816; and a corresponding fuel savings, such as the gallons of gasoline savings depicted in fuel savings region 818. Additionally or alternatively, other types of data (such as other efficiency data, helpful tips, equivalencies to cost savings, or the like) may be display in the display 800. Such displayed data may assist the user in in diagnosing or gauging the performance of the DG during a particular time interval.

By providing a visualization of the DG energy production data as, for example, a graduated change in color on a grid to indicate relative performance across two dimensions in time, a user is able to quickly assess performance of the DG and identify meaningful variations in energy production versus using a traditional line graph or numerical table presentations. The variation in color parameters (such as intensity and saturation) used in depicting the energy production over time provides a means to rapidly detect patterns in energy production. In some embodiments, users are able to "drill down" on each cell in the grid 810 to obtain additional data or displays. For example, if a user drills in on a cell representing Oct. 31, 2010 (e.g., by clicking on that cell), a new two-dimensional time-based grid may be displayed showing the energy production data over various time intervals for that day. Such additional data and/or displays may further help identify a point an energy production issue that may then be addressed.

Figure 9:
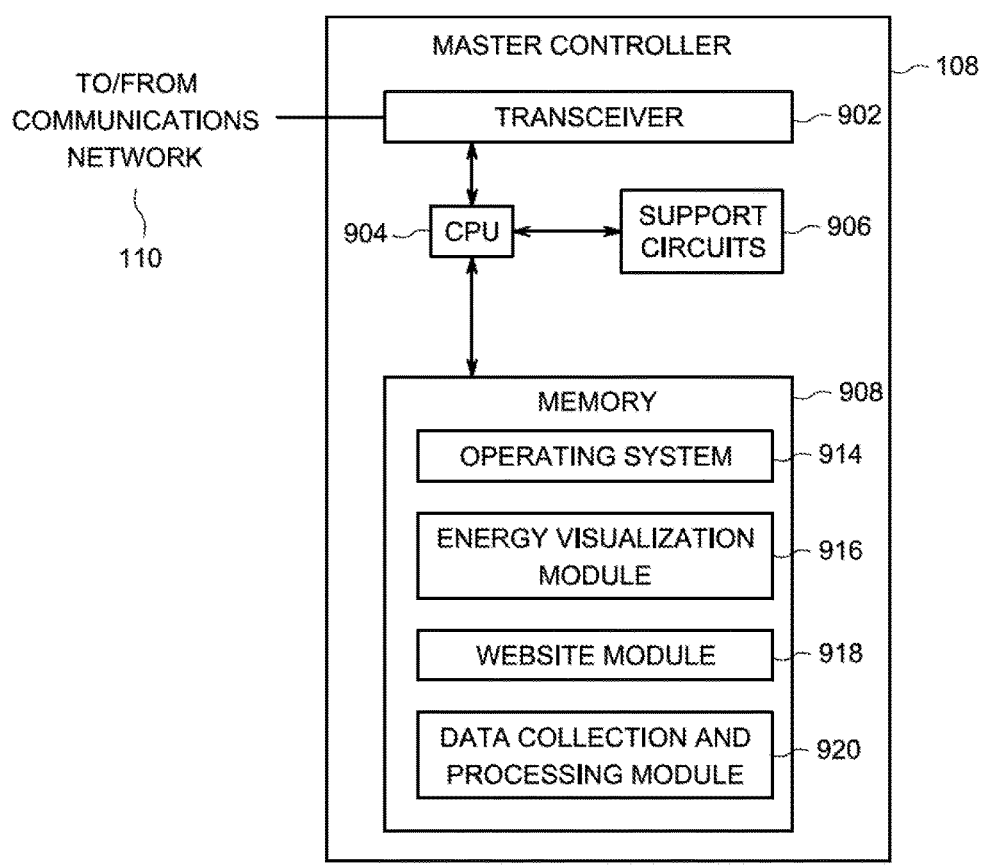
FIG. 9 is a block diagram of a master controller in accordance with one or more embodiments of the present invention.

FIG. 9 is a block diagram of a master controller 108 in accordance with one or more embodiments of the present invention. The master controller 108 may be comprised of hardware, software, or a combination thereof and comprises at least one central processing unit (CPU) 904 coupled to each of a transceiver 902, support circuits 906, and a memory 908. The CPU 904 may comprise one or more conventionally available microprocessors, microcontrollers and/or combinations thereof configured to execute non-transient software instructions to perform various tasks in accordance with the present invention. Alternatively, the CPU 904 may include one or more application specific integrated circuits (ASIC). The support circuits 906 are well known circuits used to promote functionality of the central processing unit. Such circuits include, but are not limited to, a cache, power supplies, clock circuits, buses, network cards, input/output (I/O) circuits, and the like. The master controller 108 may be implemented using a general purpose computer that, when executing particular software, becomes a specific purpose computer for performing various embodiments of the present invention.

The memory 908 may comprise random access memory, read only memory, removable disk memory, flash memory, and various combinations of these types of memory. The memory 908 is sometimes referred to as main memory and may, in part, be used as cache memory or buffer memory. The memory 908 generally stores the operating system 914, if necessary, of the master controller 108. The operating system 914 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The transceiver 902 communicatively couples the master controller 108 to the communications network 110 for communication to and from the communications network 110. The transceiver 902 may be communicatively coupled to the communications network 110 using wireless and/or wired techniques.

The memory 908 may store various forms of application software, such as an energy visualization module 916, a website module 918, and a data collection and processing module 920. The data collection and processing module 920 collects data from the controllers 104, such as energy production data, energy consumption data, power generation data, power consumption data, and the like). The data collection and processing module 920 may process and store the collected data; for example, the data collection and processing module 920 may aggregate collected energy data for one or more time intervals (e.g., energy production data may be aggregated over hour-long periods, day-long periods, and the like) and store the aggregated data for use in generating the energy visualization displays described herein. The data collection and processing module 920 may also determine a maximum energy data value, such as a maximum energy production over a particular time interval, for use in generating the data visualization scale described herein. The energy visualization module 916 may generate one or more data visualization scales as described herein, as well as generate the energy data visualization displays described herein. In some embodiments, the website module 918 may be executed for rendering the energy data visualization display on the website 114.

The foregoing description of embodiments of the invention comprises a number of elements, devices, circuits and/or assemblies that perform various functions as described. These elements, devices, circuits, and/or assemblies are exemplary implementations of means for performing their respectively described functions While the foregoing is directed to embodiments of the present invention, other and further embodiments of the invention may be devised without departing from the basic scope thereof.

The invention claimed is:

1. A computer-implemented method for providing a visualization of energy data, comprising:
   determining with a processor, based on an energy visualization scale for visually depicting quantities of energy generated in terms of commensurate color parameters, one or more color parameters respectively corresponding to each energy data value of a plurality of energy data values, wherein each energy data value of the plurality of energy data values specifies a quantity of energy produced by a distributed generator (DG) and the corresponding color parameters are commensurate with the quantity of energy produced as defined by the energy visualization scale; and
   generating, with the processor, a display image which depicts the plurality of energy data values as the respectively corresponding one or more color parameters in a grid layout across two dimensions in time.

2. The method of claim 1, wherein the grid layout comprises a plurality of cells, and wherein each cell of the plurality of cells depicts a different energy data value of the plurality of energy data values in terms of the corresponding one or more color parameters.

3. The method of claim 2, wherein each cell of the plurality of cells depicts the corresponding energy data value as a level of color intensity.

4. The method of claim 3, wherein the energy visualization scale maps the plurality of energy data values to each of (i) a plurality color saturation levels and (ii) a plurality of color intensity levels.

5. The method of claim 1, wherein a maximum value of the energy visualization scale is set to correspond to a maximum energy data value pertaining to the DG.

6. The method of claim 5, further comprising dynamically adapting the energy visualization scale based on a change in the maximum energy data value.

7. A non-transitory computer readable medium comprising a program that, when executed by a processor, performs a method for providing a visualization of energy data, the method comprising:
   determining with a processor, based on an energy visualization scale for visually depicting quantities of energy generated in terms of commensurate color parameters, one or more color parameters respectively corresponding to each energy data value of a plurality of energy data values, wherein each energy data value of the plurality of energy data values specifies a quantity of energy produced by a distributed generator (DG) and the corresponding color parameters are commensurate with the quantity of energy produced as defined by the energy visualization scale; and
   generating, with the processor, a display which depicts the plurality of energy data values as the respectively corresponding one or more color parameters in a grid layout across two dimensions in time.

8. The non-transitory computer readable medium of claim 7, wherein the grid layout comprises a plurality of cells, and wherein each cell of the plurality of cells depicts a different energy data value of the plurality of energy data values in terms of the corresponding one or more color parameters.

9. The non-transitory computer readable medium of claim 8, wherein each cell of the plurality of cells depicts the corresponding energy data value as a level of color intensity.

10. The non-transitory computer readable medium of claim 9, wherein the energy visualization scale maps the plurality of energy data values to each of (i) a plurality color saturation levels and (ii) a plurality of color intensity levels.

11. The non-transitory computer readable medium of claim 7, wherein a maximum value of the energy visualization scale is set to correspond to a maximum energy data value pertaining to the DG.

12. The non-transitory computer readable medium of claim 11, wherein the method further comprises dynamically adapting the energy visualization scale based on a change in the maximum energy data value.

13. A system for providing a visualization of energy data for display, comprising:
   a distributed generator (DG) for producing energy; and
   a master controller comprising one or more processors and a memory, the master controller being communicably coupled to the DG and the memory containing instructions executable by the one or more processors to:
   (i) determine with a processor, based on an energy visualization scale for visually depicting quantities of energy generated in terms of commensurate color parameters, one or more color parameters respectively corresponding to each energy data value of a plurality of energy data values, wherein each energy data value of the plurality of energy data values specifies a quantity of energy produced by the DG and the corresponding color parameters are commensurate with the quantity of energy produced as defined by the energy visualization scale, and (ii) generate, with the processor, a display that depicts the plurality of energy data values as the respectively corresponding one or more color parameters in a grid layout across two dimensions in time.

14. The system of claim 13, wherein the grid layout comprises a plurality of cells, and wherein each cell of the plurality of cells depicts a different energy data value of the plurality of energy data values in terms of the corresponding one or more color parameters.

15. The system of claim 14, wherein each cell of the plurality of cells depicts the corresponding energy data value as a level of color intensity.

16. The system of claim 15, wherein the energy visualization scale maps the plurality of energy data values to each of (i) a plurality color saturation levels and (ii) a plurality of color intensity levels.

17. The system of claim 13, further comprising dynamically adapting the energy visualization scale based on a change in a maximum energy data value pertaining to the DG.

* * * * *